(12) United States Patent
Maier et al.

(10) Patent No.: US 8,855,945 B2
(45) Date of Patent: Oct. 7, 2014

(54) FEEDFORWARD CONTROL OF THE VOLUME FLOW IN A HYDRAULIC SYSTEM

(75) Inventors: Oliver Maier, Worms (DE); Sascha Schaefer, Bad Camberg (DE); Thomas Weispfenning, Ober-Ramstadt (DE); Peter Willimowski, Darmstadt (DE); Rolf Isermann, Seeheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 1596 days.

(21) Appl. No.: 11/304,347

(22) Filed: Dec. 15, 2005

(65) Prior Publication Data

US 2007/0065691 A1    Mar. 22, 2007

Related U.S. Application Data

(60) Provisional application No. 60/719,449, filed on Sep. 22, 2005.

(51) Int. Cl.
*F04D 27/00* (2006.01)
*H01M 8/04* (2006.01)

(52) U.S. Cl.
CPC ...... *H01M 8/04007* (2013.01); *H01M 2250/20* (2013.01); *Y02E 60/50* (2013.01); *F04D 27/001* (2013.01); *H01M 8/04014* (2013.01); *Y02T 90/32* (2013.01)
USPC .......................................................... 702/45

(58) Field of Classification Search
CPC .................................................... F04D 27/001
USPC .............................. 702/45–51, 100, 138, 140
See application file for complete search history.

(56) References Cited

U.S. PATENT DOCUMENTS

| | | | | |
|---|---|---|---|---|
| 4,536,789 A * | 8/1985 | Bains | ............................... | 348/81 |
| 4,681,264 A * | 7/1987 | Johnson, Jr. | ................ | 239/589.1 |
| 4,821,564 A * | 4/1989 | Pearson et al. | ............. | 73/152.31 |
| 5,431,346 A * | 7/1995 | Sinaisky | ........................ | 239/399 |
| 6,517,309 B1 * | 2/2003 | Zaher | ................................. | 415/1 |
| 2003/0165725 A1* | 9/2003 | Kudou et al. | .................... | 429/26 |
| 2005/0084737 A1* | 4/2005 | Wine et al. | ...................... | 429/38 |
| 2005/0095473 A1* | 5/2005 | Sakakida et al. | ................ | 429/20 |
| 2005/0103033 A1* | 5/2005 | Schwartz et al. | ............... | 62/185 |
| 2005/0126306 A1* | 6/2005 | Wang et al. | ................. | 73/861.77 |
| 2005/0164048 A1* | 7/2005 | Wheat et al. | ..................... | 429/13 |
| 2006/0263652 A1* | 11/2006 | Logan | ............................. | 429/13 |

* cited by examiner

*Primary Examiner* — Bryan Bui
(74) *Attorney, Agent, or Firm* — John A. Miller; Miller IP Group, PLC

(57) ABSTRACT

A thermal sub-system for a fuel cell system that employs an algorithm using feed-forward control. The algorithm calculates a Reynolds number based on the velocity of the cooling fluid, a diameter of a coolant loop pipe and a kinematic viscosity (temperature) of a cooling fluid. The algorithm also uses a pressure loss number based on the Reynolds number and a position of a by-pass valve. The algorithm also defines a pressure loss value based on the pressure loss number, the density of the cooling fluid and the velocity of the cooling fluid. The algorithm then calculates a delivery head value based on the pressure loss value, the fluid density and a gravitational acceleration. The algorithm then uses the delivery head value and a predetermined set-point value of the volume flow to determine a desired pump speed based on the current operating parameters of the system.

21 Claims, 2 Drawing Sheets

FEEDFORWARD CONTROL OF THE VOLUME FLOW IN A HYDRAULIC SYSTEM

CROSS REFERENCE TO RELATED APPLICATIONS

This application claims the benefit of the priority date of U.S. Provisional Patent Application No. 60/719,449, titled Feedforward Control of the Volume Flow in a Hydraulic System, filed Sep. 22, 2005.

BACKGROUND OF THE INVENTION

1. Field of the Invention

This invention relates generally to a thermal sub-system for a fuel cell system and, more particularly, to a thermal sub-system for a fuel cell system, where the thermal sub-system employs feed-forward control to determine the speed of the pump that pumps a cooling fluid through the sub-system.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work can act to operate a vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more individual cells. The fuel cell stack receives a cathode reactant gas, typically a flow of air forced through the stack by a compressor. Not all of the oxygen is consumed by the stack and some of the air is output as a cathode exhaust gas that may include liquid water and/or water vapor as a stack by-product. The fuel cell stack also receives an anode hydrogen reactant gas that flows into the anode side of the stack.

It is necessary that a fuel cell stack operate at an optimum relative humidity and temperature to provide efficient stack operation and durability. A typical stack operating temperature for automotive applications is about 80° C. The stack temperature provides the relative humidity within the fuel cells in the stack for a particular stack pressure. Excessive stack temperatures above the optimum temperature may damage fuel cell components and reduce the lifetime of the fuel cells. Also, stack temperatures below the optimum temperature reduces the stack performance. Therefore, fuel cell systems employ thermal sub-systems that control the temperature within the fuel cell stack to maintain a thermal equilibrium.

A typical thermal sub-system for an automotive fuel cell stack includes a radiator, a fan and a pump. The pump pumps a cooling fluid, such as a water/glycol mixture, through cooling fluid channels within the fuel cell stack where the cooling fluid collects the stack waste heat. The cooling fluid is directed through a pipe or hose from the stack to the radiator where it is cooled by ambient air either forced through the radiator from movement of the vehicle or by operation of the fan. Because of the high demand of radiator airflow to reject a large amount of waste heat to provide a relatively low operating temperature, the fan is usually powerful and the radiator is relatively large. The physical size of the radiator and the power of the fan have to be higher compared to those of an internal combustion engine of similar power rating because of the lower operating temperature of the fuel cell system and the fact that only a comparably small amount of heat is rejected through the cathode exhaust in the fuel cell system.

The fuel cell stack requires a certain cooling fluid flow rate to maintain the desired stack operating temperature. The cooling fluid flow rate has to be large enough so that the fuel cell stack does not get hot spots that could damage the cells. Various system parameters determine the cooling fluid flow rate including, but not limited to, the current density of the stack, the cooling fluid temperature, the cooling fluid viscosity, system pressure drop, valve position, etc. For a thermal sub-system employing a centrifugal flow pump, the cooling fluid flow correlates to the system pressure drop because there is no independence of pressure as in displacement pumps.

Because fuel cell systems are thermally sensitive, the cooling fluid flow typically requires a flow controller, such as a proportional-integral (PI) feedback controller, well known to those skilled in the art. Feedback controllers typically require a proportionally controllable pump. Because the pressure is unknown, the actual cooling fluid flow is necessary for the flow controller.

Currently, flow sensors are used to measure the flow rate of the cooling fluid in the coolant loop, and a suitable algorithm is employed to compare the measured flow rate to the desired flow rate for the particular operating parameters of the fuel cell system. However, flow sensors used for this purpose are typically not reliable. Further, these flow sensors are large, heavy and costly. It is desirable to eliminate the flow sensor from the thermal sub-system of a fuel cell system.

SUMMARY OF THE INVENTION

In accordance with the teachings of the present invention, a thermal sub-system for a fuel cell system is disclosed that employs a feed-forward control algorithm to control the cooling fluid flow in the system. The thermal sub-system includes a pump that pumps a cooling fluid through a coolant loop, a fuel cell stack and a radiator in the fuel cell system. A by-pass valve is used to selectively by-pass the radiator. The algorithm calculates a Reynolds number based on the velocity of the cooling fluid, a diameter of the coolant loop pipe and a kinematic viscosity (temperature) of the cooling fluid. The algorithm also uses a pressure loss number based on the Reynolds number and a position of the by-pass valve. The algorithm further defines a pressure loss value based on the pressure loss number, the density of the cooling fluid and the velocity of the cooling fluid. The algorithm then calculates a delivery head value based on the pressure loss value, the fluid density and gravitational acceleration. The algorithm then uses the delivery head value and a predetermined set-point value of the volume flow to determine a desired pump speed based on the current operating parameters of the system.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a thermal sub-system for a fuel cell system that employs feed-forward control for determining the speed of a pump that pumps a cooling fluid through the sub-system is merely exemplary in nature, and is in no way intended to limit the invention or its application or uses.

Figure 1:
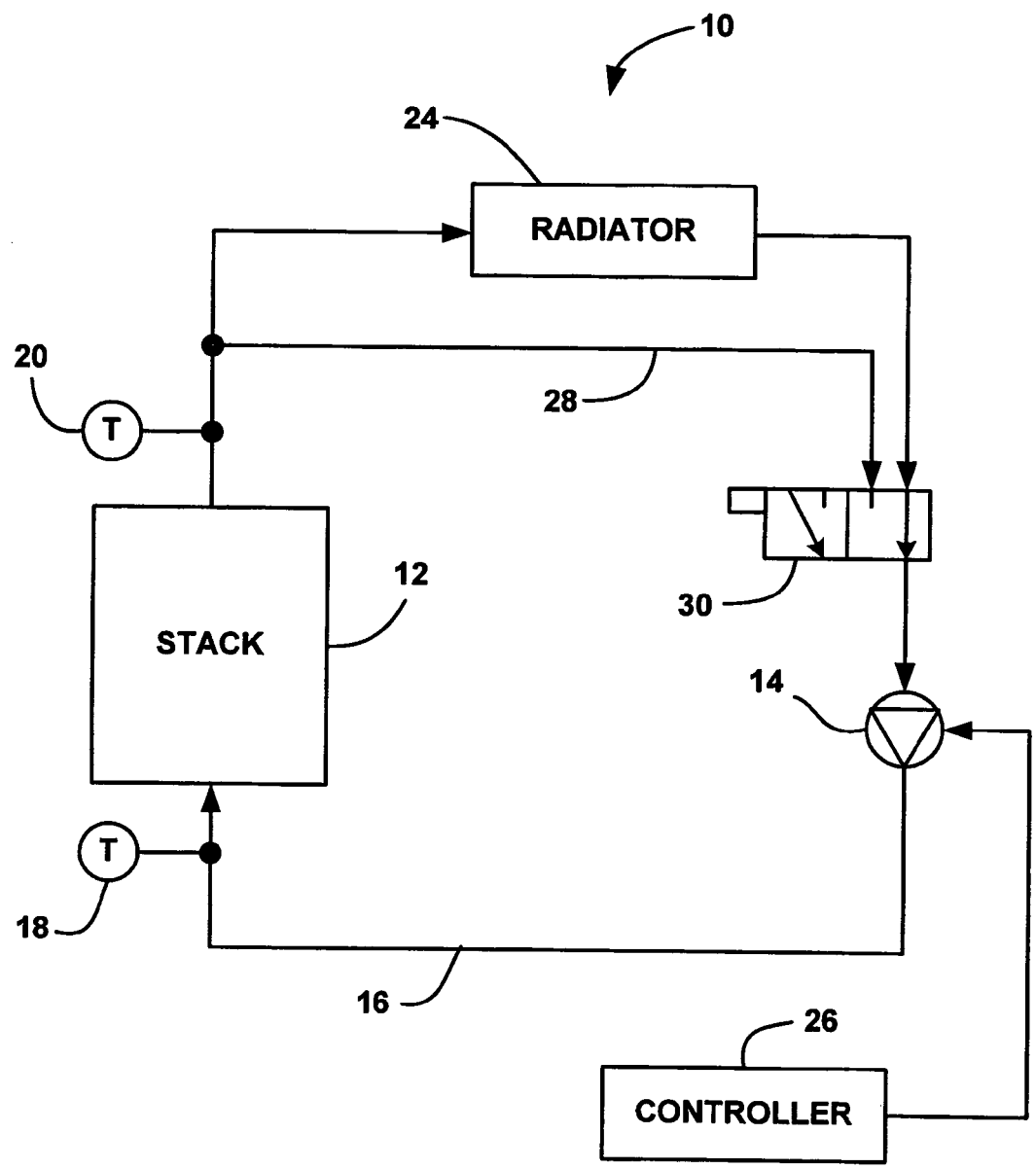
FIG. 1 is a block diagram of a fuel cell system including a pump whose speed is controlled using a feed-forward algorithm, according to an embodiment of the present invention.

FIG. 1 is a schematic diagram of a thermal sub-system for a fuel cell system 10 including a fuel cell stack 12. A coolant loop pump 14 pumps a suitable cooling fluid, such as a water/glycol mixture, through a coolant loop 16 and the stack 12. As will be discussed in detail below, a controller 26 controls the speed of the pump 14, where the controller 26 employs a feed-forward algorithm to determine the desired pump speed for the particular operating parameters of the system 10, such as stack current density.

A first temperature sensor 18 measures the temperature of the cooling fluid in the coolant loop 16 as it is being input into the stack 12 and a second temperature sensor 20 measures the temperature of the cooling fluid in the coolant loop 16 as it is being output from the stack 12. A suitable chilling device, such as a radiator 24, cools the cooling fluid in the coolant loop from the stack 12 so that it is reduced in temperature. The radiator 24 may include a fan (not shown) that forces cooling air through the radiator 12 to increase the cooling efficiency of the radiator 24. Further, other cooling devices can also be used instead of the radiator 24. A by-pass line 28 in the coolant loop 16 allows the radiator 24 to be by-passed if the operating temperature of the stack 12 is not at the desired operating temperature, such as during system start-up. A by-pass valve 30 is selectively controlled to distribute the cooling fluid through either the radiator 24 or the by-pass line 28 to help maintain a desired operating temperature. The valve 30 can be any suitable valve for this purpose that can selectively provide a certain amount of the cooling fluid to the radiator 24 and the by-pass line 28.

Figure 2:
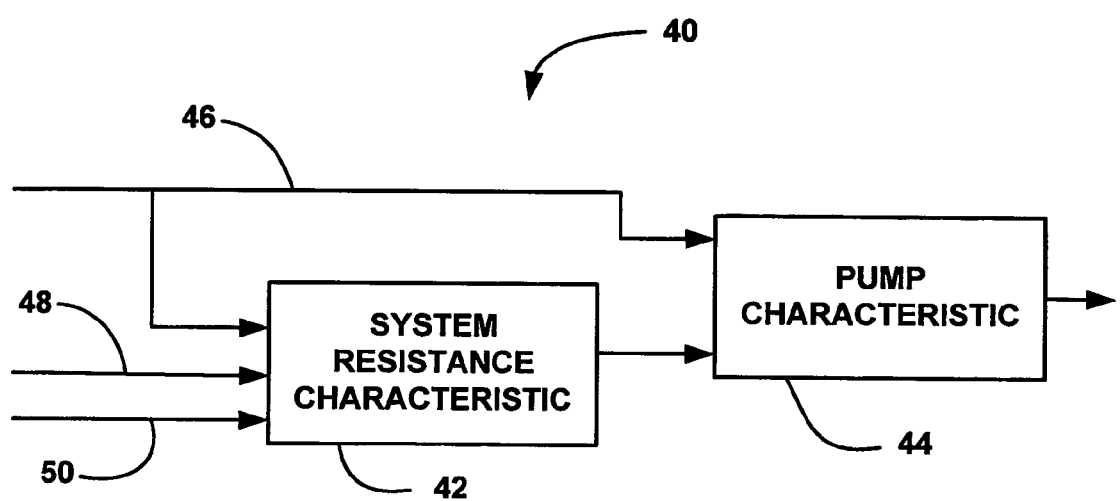
FIG. 2 is a block diagram of the feed-forward algorithm used to determine the desired pump speed.

According to the invention, the controller 26 employs a feed-forward algorithm to calculate the desired pump speed by knowing the pump and system characteristics and the cooling fluid temperature. FIG. 2 is a block diagram 40 of the feed-forward algorithm used by the controller 26, according to one embodiment of the present invention. The algorithm calculates a system resistance characteristic as a delivery head value H in a system resistance characteristic processor 42. To determine the delivery head value H, the system resistance characteristic processor 42 receives a volume flow set-point value $\dot{V}_{pmp\_sp}$ on line 46 for the volume flow that provides the desired volume flow, the temperature of the cooling fluid $T_{Fld}$ on line 48 and the position $Pos_{Vlv}$ of the by-pass valve 30 on line 50. The volume flow set-point value $\dot{V}_{pmp\_sp}$ is provided by a look-up table for the current operating parameters of the system 10. The system resistance characteristic is based mainly on a pressure loss number ζ that is a function of the Reynolds number Re and the position $Pos_{Vlv}$ of the by-pass valve 30. Particularly, the cooling system will have a certain resistance as the cooling fluid flows through the coolant loop 16 based on various parameters that determine its flow.

The pressure loss number ζ is a non-dimensional value and is defined as:

$$\zeta = \frac{\Delta p}{1/2 \rho w^2} \quad (1)$$

Where Δp is the pressure loss in Pa, ρ is the fluid density of the cooling fluid in kg/m³, and w is the fluid velocity of the cooling fluid in m/s.

The Reynolds number Re is defined as:

$$Re = \frac{w \cdot d}{v} \quad (2)$$

Where d is the hydraulic diameter of the coolant loop 16 in m and v is the kinematic viscosity determined by the temperature of the cooling fluid in m²/s.

As is well understood in the art, the kinematic viscosity value v can be calculated from the measured temperature values from one or both of the temperature sensors 18 and 20. Because the pressure drop will decrease as the temperature of the cooling fluid increases as a result of a decrease in fluid viscosity, using the measured temperature value from the temperature sensor 18 will provide a higher flow rate because the temperature of the cooling fluid is lower as it enters the stack 12. In one embodiment, an average of the measured temperature values from both of the temperature sensors 18 and 20 is used.

The relationship between the volume flow $\dot{V}$ and the velocity w of the cooling fluid is given as:

$$\dot{V} = A \cdot w \quad (3)$$

Where A is a cross-sectional area of the coolant loop in m².

Equations (1)-(3) show that for a particular cooling fluid temperature provided by the kinematic viscosity v, the pressure drop in the coolant loop 16 increases along a certain function as the volume flow $\dot{V}$ increases. This function can be stored using the non-dimensional parameters Re and ζ in a look-up table in combination with the position $Pos_{Vlv}$ of the by-pass valve 30. Thus, by knowing the volume flow set-point $\dot{V}_{pmp\_sp}$ and the temperature of the cooling fluid $T_{Fld}$, the Reynolds number Re can be calculated by these equations.

A relationship for the delivery head value H is provided by:

$$\Delta p = \rho g H \quad (4)$$

Where g is the gravitational acceleration in m/s² and H is the deliver head value in m.

Based on the discussion above, once the Reynolds number Re is calculated by equation (2), then the pressure loss number ζ is known as a function of the Reynolds number Re and the position $Pos_{Vlv}$ of the valve 30. This relationship between the pressure loss number ζ, the Reynolds number Re and the position $Pos_{Vlv}$ of the valve 30 can be stored in a look-up table. Once the pressure loss number ζ is known, then the pressure loss value Δp can be calculated from equation (1). Once the pressure loss value Δp is known, then the delivery head value H can be calculated by equation (4).

From the above equations, the delivery head value H is calculated by the system resistance characteristic processor 42 as:

$$H = \frac{\zeta}{2gA^2}\dot{V}^2 \quad (5)$$

The delivery head value H is output to a pump characteristic processor 44 that calculates the desired pump speed n based on the delivery head value H and the volume flow set-point value $\dot{V}_{pmp\_sp}$. In one embodiment, the processor 44 uses the polynomial equation (6) below for this purpose, where $a_1$, $a_2$ and $a_3$ are constant coefficients.

$$H = a_1 n^2 + a_2 n\dot{V} + a_3 \dot{V}^2 \quad (6)$$

Equation (6) provides a quadratic relationship between the delivery head value H and the volume flow set-point value $\dot{V}$ for the pump speed value n at the output of the processor 44. The pump speed value n commands the speed controller of the motor that drives the pump 14. The volume flow $\dot{V}$ through the coolant loop 16 will be changed by adjusting the speed of the pump 14 to be equal to the desired volume flow set-point value. Therefore, the algorithm provides feed-forward control to set the speed of the pump 14 to anticipate the proper cooling fluid flow rate to provide the proper operating temperature of the stack 12 as the current density of the stack 12 changes.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for providing feed-forward flow control of a fluid being pumped through a pipe by a pump, said system comprising:
    a system resistance characteristic processor, said system resistance characteristic processor programmed to:
        calculate a Reynolds number based on a velocity of the fluid, a diameter of the pipe and a kinematic viscosity of the fluid;
        calculate a pressure loss value based on a pressure loss number, a density of the fluid and the velocity of the fluid, wherein the pressure loss number is a function of the Reynolds number; and
        calculate a delivery head value based on the pressure loss value, the density of the fluid and a gravitational acceleration of the fluid; and
    a pump characteristic processor, said pump characteristic processor programmed to determine a desired pump speed based on the delivery head value and a predetermined volume flow set-point of the fluid.

2. The system according to claim 1 wherein the system resistance characteristic processor calculates the Reynolds number using the equation:

$$Re = \frac{w \cdot d}{v}$$

where w is the velocity of the fluid, d is the diameter of the pipe and v is the kinematic viscosity of the fluid.

3. The system according to claim 1 wherein the pressure loss number is determined from a look-up table using the Reynolds number.

4. The system according to claim 1 wherein the system resistance characteristic processor calculates the pressure loss value using the equation:

$$\zeta = \frac{\Delta p}{1/2 \rho w^2}$$

where $\zeta$ is the pressure loss number, $\Delta p$ is the pressure loss value, $\rho$ is the density of the fluid and w is the velocity of the fluid.

5. The system according to claim 1 wherein the system resistance characteristic processor calculates the delivery head value using the equation:

$$H = \frac{\zeta}{2gA^2}\dot{V}^2$$

where H is the delivery head value, $\zeta$ is the pressure loss number, A is a cross-sectional area of the pipe and $\dot{V}$ is the volume flow set-point of the fluid.

6. The system according to claim 1 wherein the pump characteristic processor determines the desired pump speed using the equation:

$$H = a_1 n^2 + a_2 n\dot{V} + a_3 \dot{V}^2$$

where H is the delivery head value, n is the pump speed, $\dot{V}$ is the volume flow set-point of the fluid and $a_1$, $a_2$ and $a_3$ are constant coefficients.

7. The system according to claim 1 wherein the system resistance characteristic processor also uses a position of a valve to determine the pressure loss number.

8. The system according to claim 1 wherein the fluid is a cooling fluid that is pumped through a cooling loop by the pump to cool a fuel cell stack in a fuel cell system.

9. The system according to claim 8 wherein the fuel cell system is on a vehicle.

10. A fuel cell system comprising:
    a fuel cell stack;
    a coolant loop for directing a cooling fluid through the stack;
    a radiator positioned in the coolant loop external to the stack;
    a pump for pumping the cooling fluid through the coolant loop and the stack;
    a by-pass valve positioned in the coolant loop for by-passing the radiator; and
    a controller programmed to determine a desired speed of the pump to control a volume flow of the cooling fluid and a temperature of the stack, said controller employing a feed-forward flow control algorithm that calculates a delivery head value of a flow resistance in the coolant loop and the fuel cell stack to determine the speed of the pump.

11. The system according to claim 10 wherein the feed-forward algorithm calculates a Reynolds number based on the velocity of the cooling fluid, the diameter of a coolant loop pipe and the kinematic viscosity of the cooling fluid.

12. The system according to claim 11 wherein the feed-forward algorithm uses a pressure loss value to calculate the delivery head value and wherein the pressure loss value is determined based on a pressure loss number, which is a function of the Reynolds number and a position of the by-pass valve.

13. The system according to claim 12 wherein the feed-forward algorithm calculates the delivery head value based on the pressure loss value, the density of the fluid and the gravitational acceleration of the fluid, said controller using the delivery head value and a predetermined volume flow set-point of the cooling fluid to determine the desired speed of the pump.

14. A system including a controller programmed to provide feed-forward flow control of a fluid being pumped through a pipe by a pump, said controller including a non-transitory computer readable medium tangibly embodying computer-executable instructions for:
   calculating a Reynolds number based on a velocity of the fluid, a diameter of the pipe and a kinematic viscosity of the fluid;
   calculating a pressure loss value based on the pressure loss number, a density of the fluid and the velocity of the fluid, wherein the pressure loss number is a function of the Reynolds number;
   calculating a delivery head value based on the pressure loss value, the density of the fluid and a gravitational acceleration of the fluid; and
   determining a desired pump speed based on the delivery head value and a volume flow set-point.

15. The system according to claim 14 wherein calculating the Reynolds number includes using the equation:

$$Re = \frac{w \cdot d}{v}$$

where w is the velocity of the fluid, d is the diameter of the pipe and v is the kinematic viscosity of the fluid.

16. The system according to claim 14 further including determining the pressure loss number from a look-up table using the Reynolds number.

17. The system according to claim 14 wherein calculating the pressure loss value includes using the equation:

$$\zeta = \frac{\Delta p}{1/2 \rho w^2}$$

where $\zeta$ is the pressure loss number, $\Delta p$ is the pressure loss value, $\rho$ is the density of the fluid and w is the velocity of the fluid.

18. The system according to claim 14 wherein calculating the delivery head value includes using the equation:

$$H = \frac{\zeta}{2gA^2} \dot{V}^2$$

where H is the delivery head value, $\zeta$ is the pressure loss number, A is a cross-sectional area of the pipe and $\dot{V}$ is the volume flow set-point of the fluid.

19. The system according to claim 14 wherein determining the desired pump speed includes using the equation:

$$H = a_1 n^2 + a_2 n \dot{V} + a_3 \dot{V}^2$$

where H is the delivery head value, n is the pump speed, $\dot{V}$ is the volume flow set-point of the fluid and $a_1$, $a_2$ and $a_3$ are constant coefficients.

20. The system according to claim 14 further including determining the pressure loss number using a position of a valve.

21. The system according to claim 14 wherein the fluid is a cooling fluid that is pumped through a cooling loop by the pump to cool a fuel cell stack in a fuel cell system.

* * * * *